(12) United States Patent
Naito

(10) Patent No.: US 7,437,067 B2
(45) Date of Patent: Oct. 14, 2008

(54) STAND APPARATUS, ELECTRONIC EQUIPMENT USING THE SAME AND ITS ACCESSORY APPARATUS

(75) Inventor: Yoshitaka Naito, Tokyo (JP)

(73) Assignee: Olympus Corporation, Tokyo (JP)

( * ) Notice: Subject to any disclaimer, the term of this patent is extended or adjusted under 35 U.S.C. 154(b) by 447 days.

(21) Appl. No.: 11/122,188

(22) Filed: May 4, 2005

(65) Prior Publication Data

US 2005/0253962 A1 Nov. 17, 2005

(30) Foreign Application Priority Data

May 11, 2004 (JP) .............................. 2004-141014
May 11, 2004 (JP) .............................. 2004-141015

(51) Int. Cl.
*G03B 13/02* (2006.01)
*G03B 17/56* (2006.01)
*H04N 5/225* (2006.01)

(52) U.S. Cl. .................. 396/383; 396/428; 348/333.06; 348/373

(58) Field of Classification Search ................. 396/419, 396/248, 544, 374, 383, 428; 348/372, 333.06, 348/373; 248/187.1
See application file for complete search history.

(56) References Cited

U.S. PATENT DOCUMENTS 5,528,285 A 6/1996 Morikawa et al.

| 6,657,654 | B2 * | 12/2003 | Narayanaswami ....... 348/14.04 |
| 6,734,915 | B2 | 5/2004 | Nagaoka |
| 2003/0117521 | A1 | 6/2003 | Nagaoka |
| 2005/0225666 | A1 * | 10/2005 | Katakai ....................... 348/373 |

FOREIGN PATENT DOCUMENTS

| CN | 1267178 | 9/2000 |
| JP | 6-351012 | 12/1994 |
| JP | 11-258657 | 9/1999 |
| JP | 2000-260484 | 9/2000 |
| JP | 2000-261970 | 9/2000 |
| JP | 2000-312325 | 11/2000 |
| JP | 2003-087620 | 3/2003 |
| JP | 2003-198910 | 7/2003 |

OTHER PUBLICATIONS

Chinese Office Action for application No. 2005100688826, mailed Mar. 23, 2007 (6pgs.) with translation (6 pgs.).

* cited by examiner

*Primary Examiner*—W. B. Perkey
*Assistant Examiner*—Rishi S Suthar
(74) *Attorney, Agent, or Firm*—Straub and Pokotylo; John C. Pokotylo

(57) ABSTRACT

A stand apparatus having the connector so as to correspond to a position of an electronic equipment being housed and comprises a connection inhibiter member to inhibit the connection if the position of the electronic equipment being housed and a turned state of the connector do not match with each other. Furthermore, electronic equipment, e.g., a camera, can be connected with the stand apparatus electrically either in the state of the equipment body facing up with the display apparatus of the camera being folded thereon, or in the state of the display apparatus being folded onto the back side of the equipment body with the display surface facing up.

10 Claims, 12 Drawing Sheets

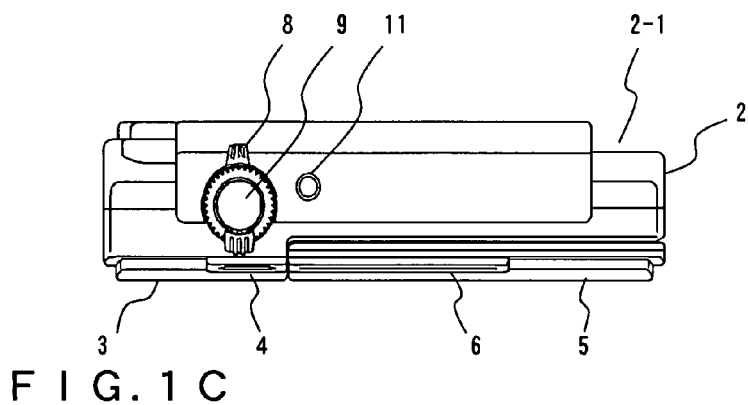
FIG. 1C
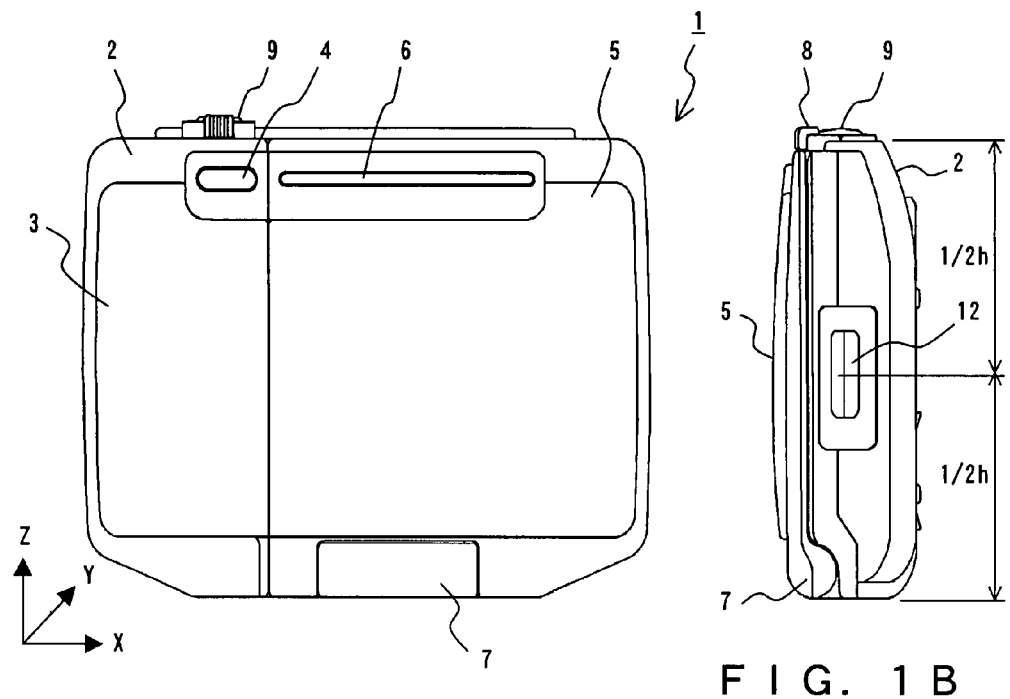
FIG. 1B
FIG. 1A

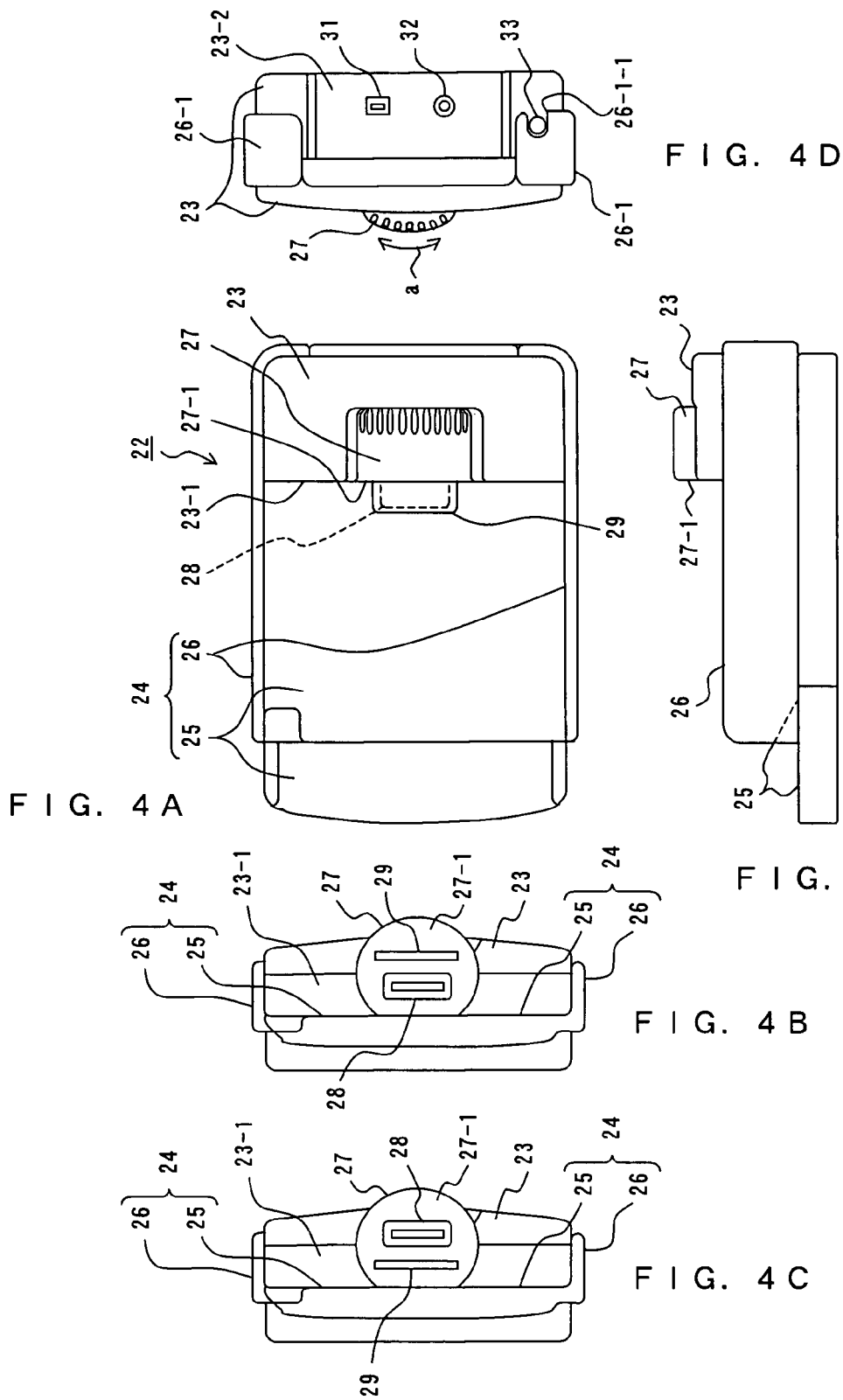

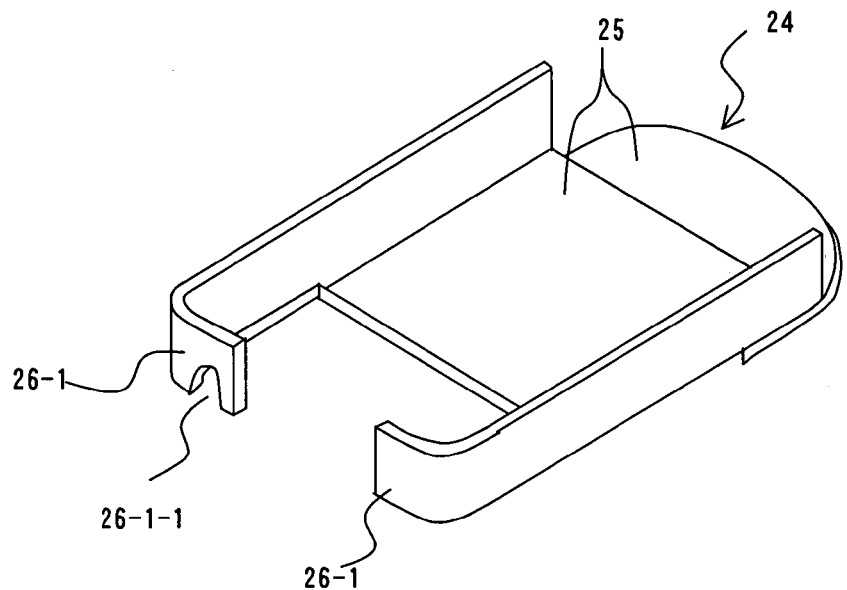
F I G. 5 A
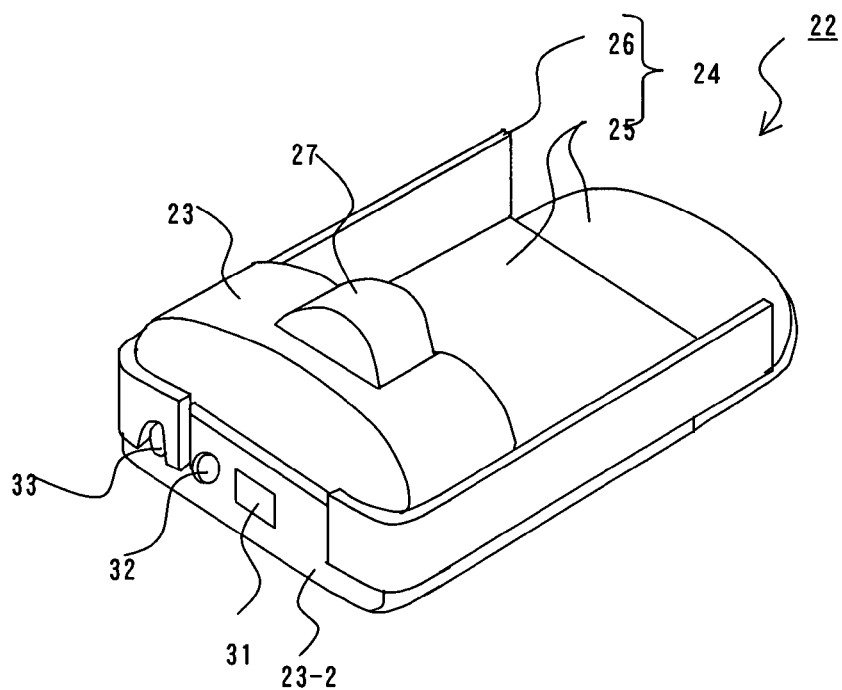
F I G. 5 B

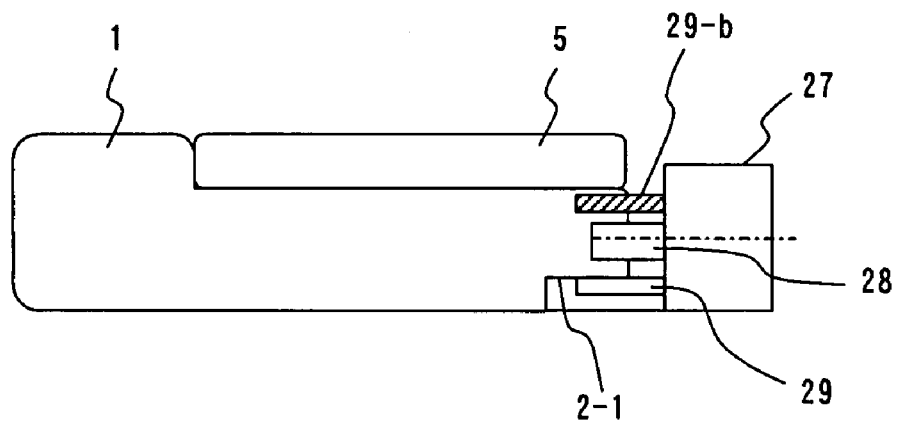
F I G. 7A
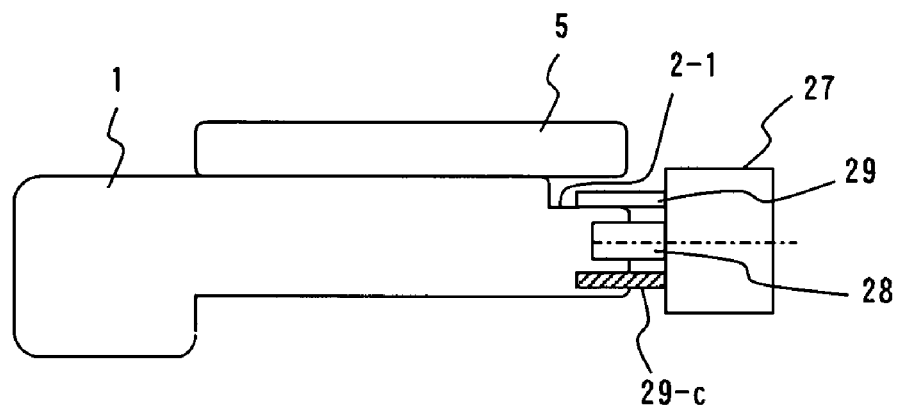
F I G. 7B

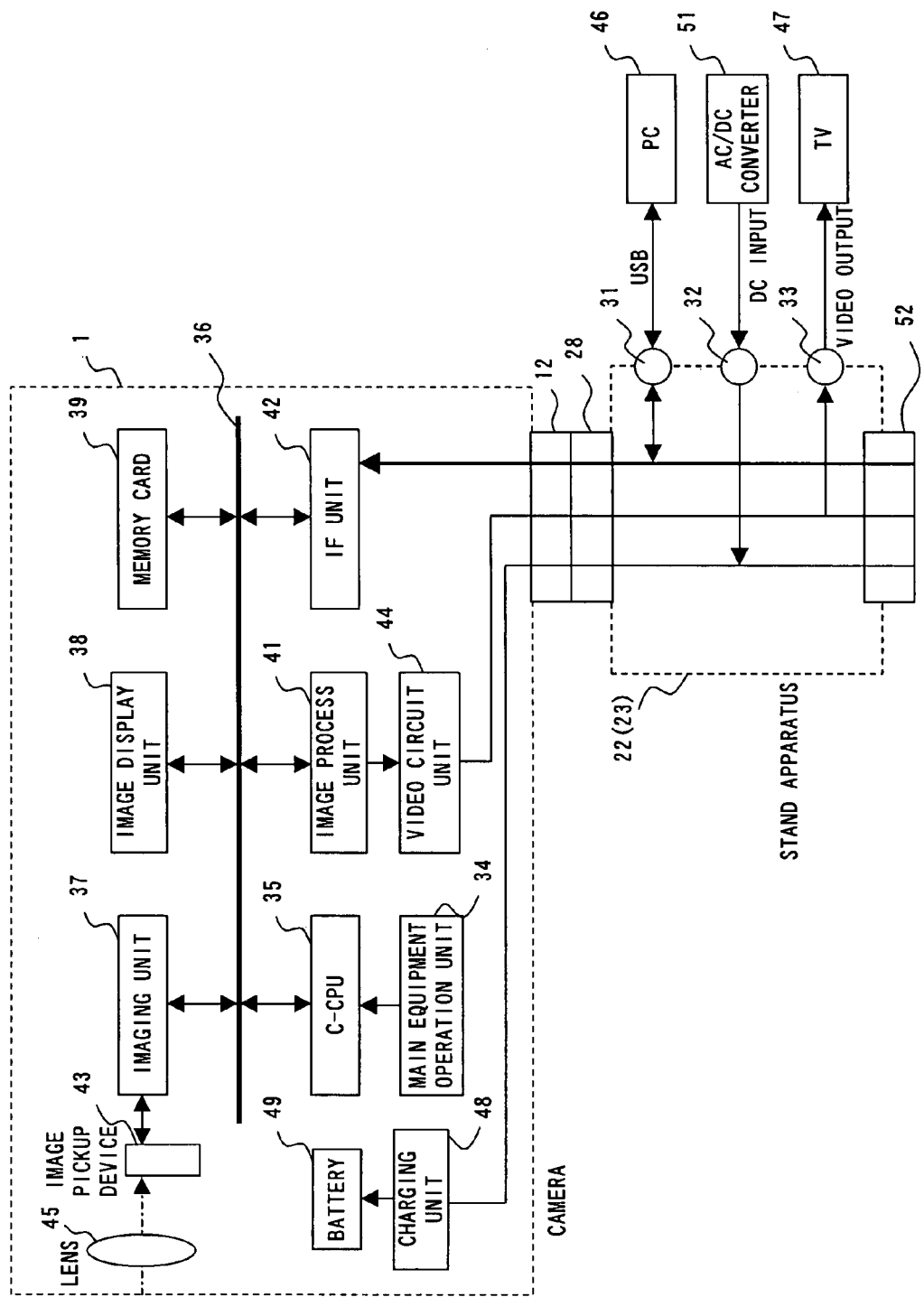
F I G. 8

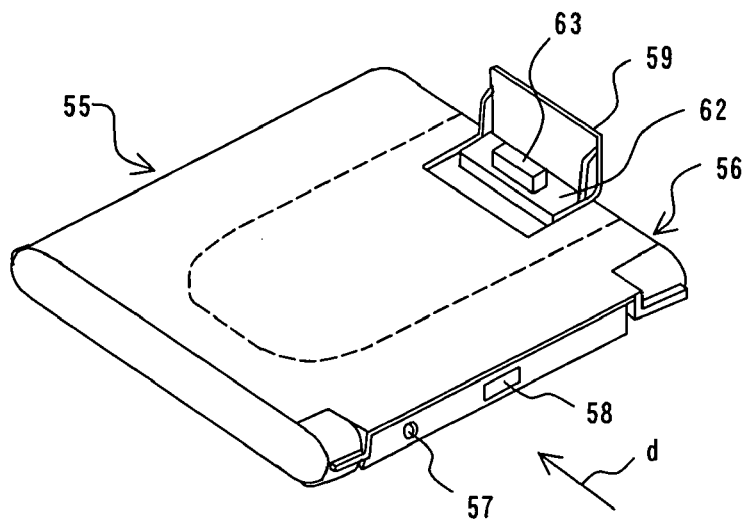
F I G. 1 0 A
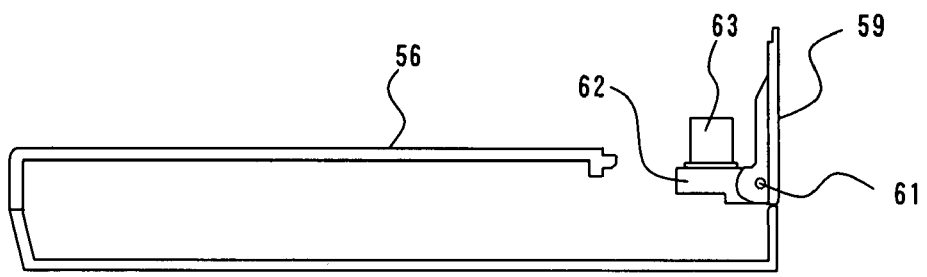
F I G. 1 0 B
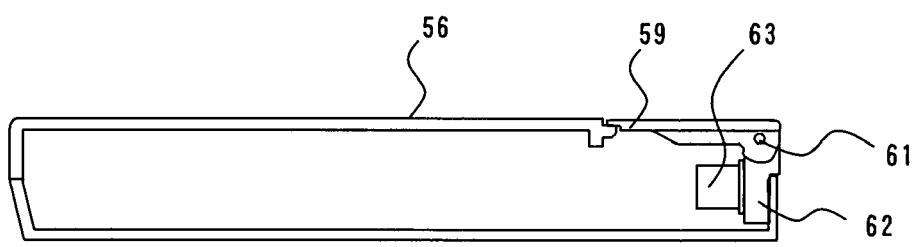
F I G. 1 0 C

STAND APPARATUS, ELECTRONIC EQUIPMENT USING THE SAME AND ITS ACCESSORY APPARATUS

CROSS REFERENCE TO RELATED APPLICATION

This application is based upon and claims the benefit of priority from the prior Japanese Application No. 2004-140114, filed May 11, 2004 and No. 2004-141015 filed May 11, 2004, the entire contents of which are incorporated herein by reference.

BACKGROUND OF THE INVENTION

1. Field of the Invention

The present invention relates to a stand apparatus mounting electronic equipment in a plurality of orientations, to electronic equipment using the stand apparatus and to an accessory apparatus for expanding the functions of the electronic equipment.

2. Description of the Related Art

The majority of electronic equipment is conventionally configured to be used with a stand apparatus which is either an attachment thereto or one for purchase. For instance, a portable camera such as a digital camera has also been configured as such. Such a stand apparatus charges the battery installed in the camera with AC power as the installed state when the camera is set in the accessory apparatus.

Also, a lot of portable electronic equipment is generally configured to include only basic and necessary functions therein, and not auxiliary or expansive functions, for size and cost limitations. In such cases, an external apparatus with the above noted auxiliary and expansive functions is prepared to provide for a user as an accessory apparatus for the above noted electronic equipment either by a standard set or for purchase.

For instance, what has been proposed is an accessory apparatus which holds a digital camera and comprises a charging function for charging the digital camera being held and a hard disk for accumulating the image data photographed by the digital camera, et cetera (e.g., a Japanese patent laid-open application publication No. 2000-312325: refer to the abstract and FIGS. 2 and 3).

Also, what has been proposed is another apparatus which houses a digital camera and further includes a printer in addition to the above noted functions (e.g., a Japanese patent laid-open application publication No. 06-351012: refer to the abstract and FIG. 1).

Incidentally, the outer shape of a digital camera varies with the camera, far from uniform, so that the stand apparatus is prepared for each camera uniquely. Also, the recent stand apparatuses are equipped with not only a function of charging the camera battery, but also the functions of camera stand for viewing photographed images displayed in the display apparatus of the camera, connecting for data communications between the camera and external equipment, et cetera, by supplying the AC power as power source therefor.

The orientation of a camera when installing in a stand apparatus may not be important if it is just for charging the battery, the above noted case, however, requires the orientation of the installed camera be changeable depending on the function to be used.

For instance, the display surface is necessary to face the front for displaying an image, while the lens is necessary to face the front for photographing an image, when the camera is mounted on a stand apparatus.

This requires not only the housing part of the stand apparatus be featured for accommodating the camera in any orientation, but also the connecting part thereof with the camera be configured for accommodating the camera connector in any orientation.

Especially when the orientation of the camera is in reverse, that of the receptacle with the camera connector is likewise, and therefore a usual configuration cannot accommodate such a case.

Accordingly, a proposal has been made, in which a charging and communication between a camera and stand apparatus are respectively performed in non-contacting ways, for example (e.g., refer to a Japanese patent laid-open application publication No. 2003-087620). Also, another example has been proposed for setting up pin array symmetrically in two ways (e.g., refer to a Japanese patent laid-open application publication No. 2003-198910).

Yet another camera has been proposed in which a display apparatus is positioned to cover the front of the camera for protecting the lens at the time of not photographing, while the display apparatus is swung to the overhead of the camera from the front thereof for opening the lens in the front thereof and facing the display apparatus to the photographer at the time of photographing (e.g., refer to a japanese patent laid-open application publication No. 11-258657).

SUMMARY OF THE INVENTION

A stand apparatus according to the present invention, being the stand apparatus for housing electronic equipment in electrical connection with the stand apparatus, comprises a housing unit for housing the electronic equipment in at least two different orientations; a stand body comprising a stand connection unit for connecting with a connection unit of the electronic equipment; and a shifter unit for shifting a position of the stand connection unit in response to an orientation of the electronic equipment being housed in the housing unit. The housing unit is configured for housing the electronic equipment in either orientation of its front to back direction, for example.

And, a camera system according to the present invention, being the camera system comprising a camera and a stand apparatus housing the camera in electrical connection with the stand apparatus, wherein the camera comprises a connection unit on one side thereof for connecting with the stand apparatus electrically, and the stand apparatus comprises a housing unit for housing the camera in either orientation thereof, i.e., front side up or down, a stand connection unit for connecting with the connection unit of the camera electrically, and a shifter unit for shifting a position of the stand connection unit in response to an orientation of the camera being housed.

And, a camera according to the present invention comprises a connection unit for connecting electrically with the same connection unit of the stand apparatus when the same stand apparatus housing the camera in either orientation thereof, i.e., front side up or down.

And, an accessory apparatus according to the present invention, being the accessory apparatus in electrical connection with portable electronic equipment, comprises a first accessory comprising a housing unit for housing the electronic equipment and a feeder unit for feeding at least thereto; and a second accessory, being connected with the first accessory, for having an expansive function relating to the electronic equipment, wherein each of the first and second accessories is equipped with a power input unit for supplying power to the electronic equipment from the outside, and an inhibiter unit is comprised for inhibiting the use of a power input unit equipped in the first accessory when the second accessory is connected to the first accessory.

BRIEF DESCRIPTION OF THE DRAWINGS

FIG. 1A shows a front view of a camera as a first embodiment;

FIG. 1B shows a view of a side equipped with a connection unit of the camera according to the first embodiment;

FIG. 1C shows a top view of the camera according to the first embodiment;

FIG. 4A shows a top view of the camera stand apparatus according to a second embodiment;

FIGS. 4B and 4C show a front view of the camera stand apparatus according to the second embodiment;

FIG. 4D shows a rear view of the camera stand apparatus according to the second embodiment;

FIG. 4E shows a side view of the camera stand apparatus according to the second embodiment;

FIG. 5A is a diagonal perspective view showing the housing unit only of a camera stand apparatus;

FIG. 5B is a diagonal perspective view showing a state of housing unit uniting with a stand body detachably;

FIGS. 7A and 7B show a position of a connection inhibiter member for a camera mounted onto a camera stand apparatus;

FIG. 8 is a block diagram of a camera system when a camera is correctly coupled with a camera stand apparatus;

FIG. 10A shows a diagonal perspective view of a hard disk apparatus as a second accessory with an expansive function for a camera according to a fourth embodiment;

FIG. 10B shows a cross-sectional view from the direction of arrow d indicated in FIG. 10A;

FIG. 10C shows a state of the hinged part shown by FIG. 10B being closed;

DESCRIPTION OF THE PREFERRED EMBODIMENTS

Figure 2C:
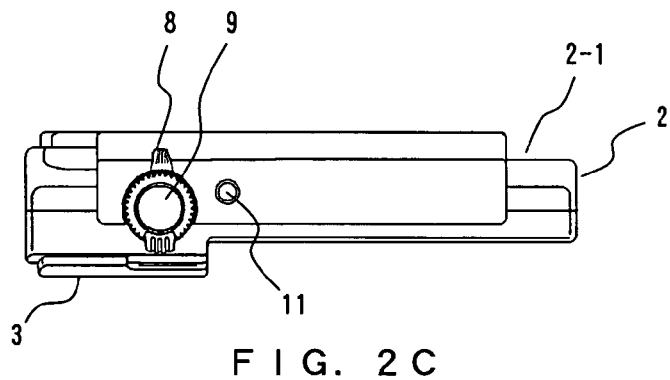
FIG. 2C shows a top view with a display apparatus of a camera being turned to a lower position.

Preferred embodiments of the present invention will be described in reference to the accompanying drawings as follows.

First Embodiment

FIG. 1A shows a front view of camera as a first embodiment; FIG. 1B shows a view of the side equipped with a connection unit of the camera; and FIG. 1C shows a top view thereof. Note that FIGS. 1A, 1B and 1C each show a whole view of the camera with a display apparatus thereof in a closed position.

Also note that the camera shown by FIGS. 1A, 1B and 1C is a digital camera and is used as an example of electronic equipment.

Further note that the following description defines the direction of X as that of the width of camera, the direction of Y as that of the thickness thereof and the direction of Z as that of the height thereof, all as shown by FIG. 1A.

As shown by FIGS. 1A, 1B and 1C, the camera 1 is featured by a holding part 3 in the position about one third of the width of the camera body 2 from the left end as the camera is viewed from the front and equipped with a self-timer notification window 4 in the upper part of the holding part 3.

And about two thirds of the right side of the camera body 2 is covered by a display apparatus 5 with its back facing the camera front, a notification light transmission window 6 for notifying the various states of the camera either by lighting or blinking a light is featured in the upper part of the display apparatus 5 and a double hinge 7 is furnished in the lower part of the display apparatus 5.

The double hinge 7 comprises two pivot shafts retained in parallel with each other in the direction of X, i.e., one pivot shaft for linking with the camera body 2 and the other for linking with the display apparatus 5 which is link-connected with the camera body 2 by the double hinge 7.

And as shown by FIG. 1C, the rear side of the camera body 2 toward the side end thereof on the opposite side of the display apparatus 5 is featured by a step part 2-1.

The top part of camera 1 is equipped with a zoom lever 8 and a shutter button 9 in the corresponding position above the self-timer notification window 4, and equipped with a remote control sensor unit 11 toward the right nearby.

As shown by FIG. 1B, the camera 1 is furnished with a camera connection unit 12, with the position thereof in the direction of the height of camera 1 being at the center of the height thereof (i.e., a half of the height h).

This configuration will retain the position of the camera connection unit 12 in the direction of camera height when the camera 1 is placed upside down. The position in the direction of camera thickness, however, changes.

Figures 2A, 2B:
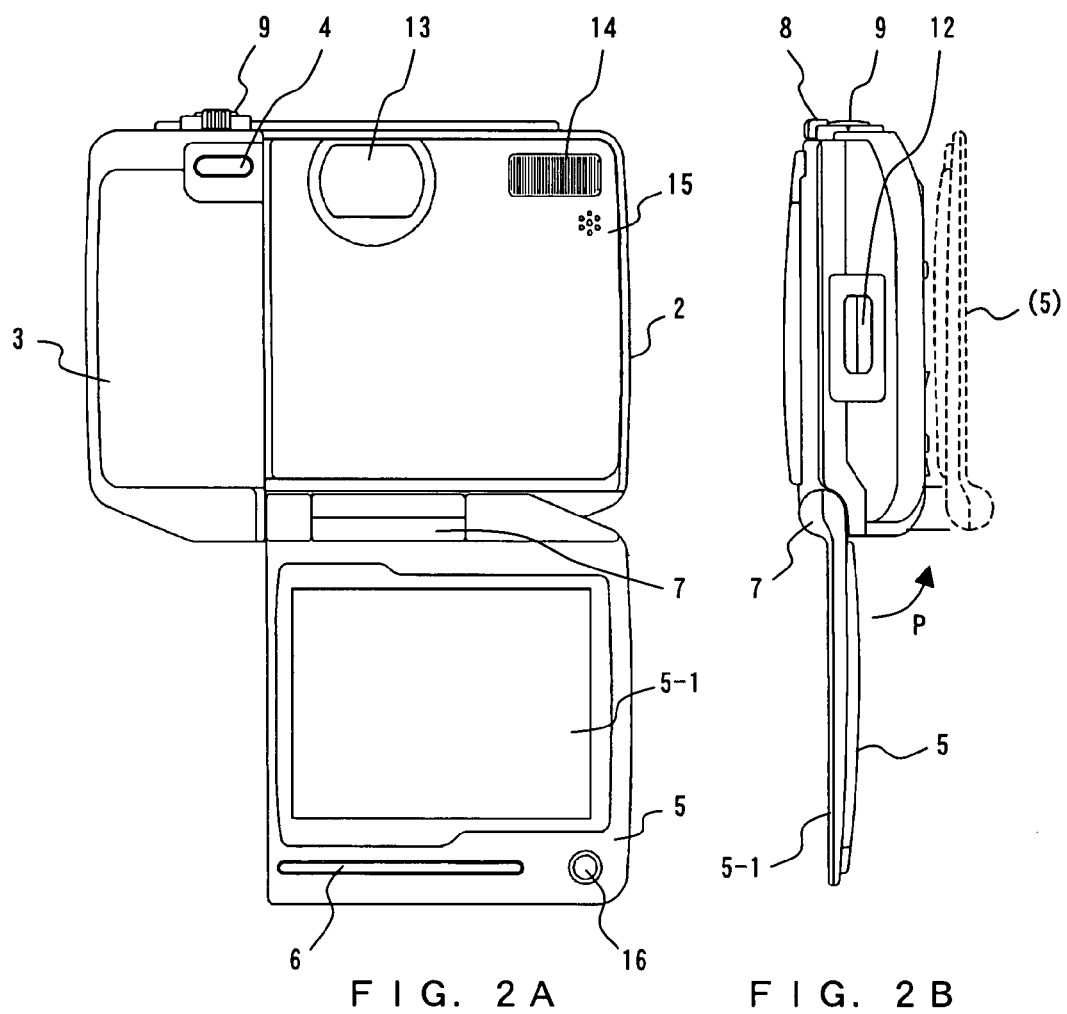
FIG. 2A shows a front view of the camera with the display apparatus of the camera being turned to a lower position.
FIG. 2B shows a view of a side equipped with a connection unit of the camera with the display apparatus of the camera being turned to a lower position.

FIGS. 2A, 2B and 2C show the whole view of the camera with the display apparatus of the camera being turned to a lower position; FIG. 2A is the front view; FIG. 2B is the view of the side equipped by the connection unit; and FIG. 2C is the top view.

As shown by FIG. 2A, as the display apparatus 5 turns toward the lower position around the double hinge 7 as the pivot, appears a photo lens window 13 in the front left upper part of the just opened part of the camera body 2, which is about the center of the whole camera, a strobe window 14 in the upper right end and a microphone 15 a little below, respectively.

Also, the display apparatus 5 positions itself with the display surface 5-1 facing front. The display apparatus 5 comprises a liquid crystal display apparatus which is the display surface 5-1.

A power switch button 16 is installed in the right below from the display surface 5-1 of the display apparatus 5. Incidentally, the notification light transmission window 6 emits a notification light when the display apparatus 5 is closed as shown by FIG. 1A or open as shown by FIG. 2A. That is, a notification light is emitted to the outside in the direction of both front and rear surfaces of the display apparatus 5. Meanwhile, the display apparatus 5 will be turned around in the direction of the arrow P to be placed on the back of the camera body 2 in the position shown by the dotted lines.

Incidentally, the display surface 5-1 of the display apparatus 5 in the opening position shown by FIGS. 2A, 2B and 2C is used as a monitor when the user of the camera 1 photographs in the direction of where the user is.

Figure 3A:
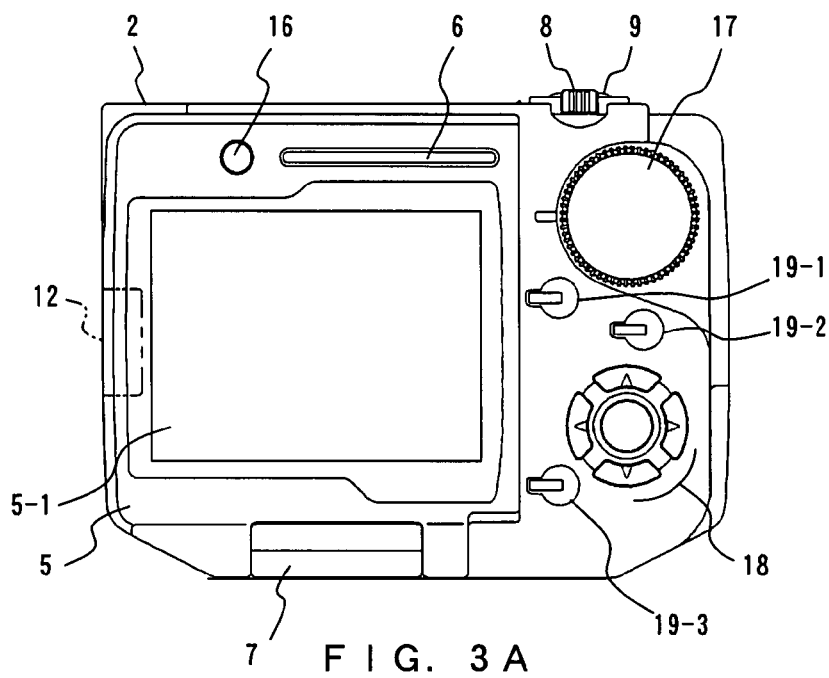
FIG. 3A shows a state of the back side of display apparatus in contact with the back side of camera body by turning the display apparatus from its lower position to the back.
Figure 3B:
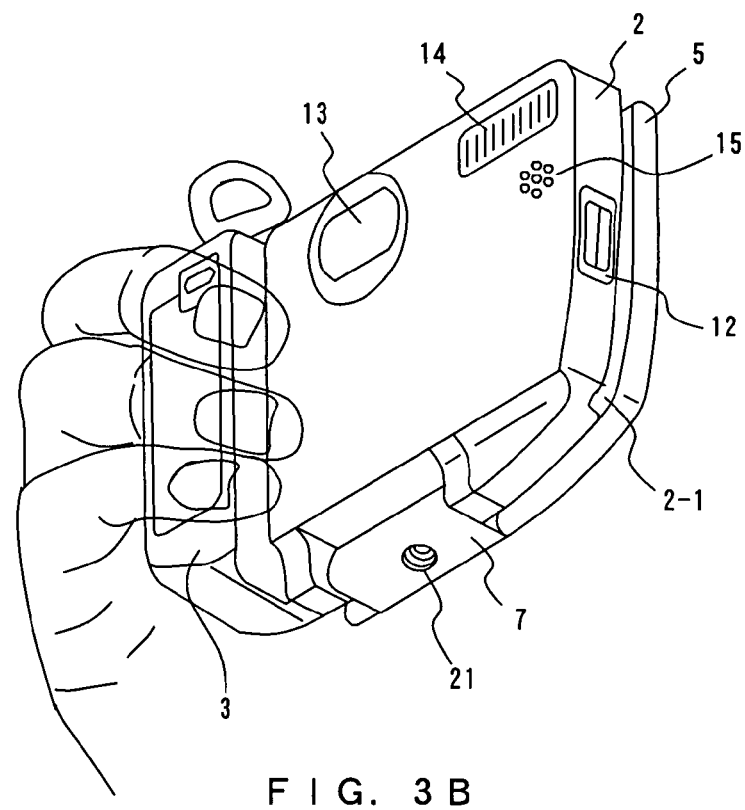
FIG. 3B shows a camera being used in a state of the back side of display apparatus in contact with the back side of camera body by turning the display apparatus from its lower position to the back.

FIG. 3A shows a state of the back side of the display apparatus 5 in contact with the back side of the camera body 2 by turning the above described display apparatus 5 from its lower position to go around the rear of the camera 1 in the direction of the arrow P shown by FIG. 2C; and FIG. 3B shows the usage state of the camera. This shows a state of the display apparatus 5 in the position shown by the dotted lines delineated in FIG. 2B.

Incidentally, FIGS. 3A and 3B show how the camera 1 is used primarily. Note also that the same component numbers are assigned in showing FIGS. 3A and 3B as the FIGS. 1A, 1B and 1C, and the FIGS. 2A, 2B and 2C, where the configurations are common with one another.

As shown by FIG. 3A, as the display apparatus 5 is turned around the rear of the camera 1 so as to cover about two thirds of the back surface of the camera 1 by placing the display surface 5-1 on the back surface thereof when using the camera 1, the remaining one third of the back surface mounts a mode dial 17, a cross button 18 and auxiliary operation buttons 19 (i.e., 19-1, 19-2 and 19-3).

This enables the camera user to operate the camera while looking at display screens shown in the display surface 5-1 of the display apparatus 5.

And it is possible to photograph by pressing the shutter button 9 with holding the holding unit 3 by hand and watching the images displayed in the display surface 5-1.

And a tripod screw hole 21 will be revealed facing downward, which is featured in the back side of the double hinge 7 when turning the display apparatus 5 around to the rear of the camera 1 as shown by FIG. 3B so as to flip over from the position at the time of carrying the camera 1 as shown by FIGS. 1A, 1B and 1C.

This configuration makes it possible to photograph with the camera 1 fixed onto a tripod in the state shown by FIGS. 3A and 3B.

Second Embodiment

FIG. 4A shows the top view of a stand apparatus as a first accessory for the above described camera 1 according to a second embodiment; FIGS. 4B and 4C are the front view; FIG. 4D is the rear view; and FIG. 4E is a side view. As shown by FIG. 4A through 4E, a stand apparatus 22 comprises a stand body 23 and a housing unit 24. FIGS. 4B and 4C shows two positions of a turning unit 27 moving by being turned when viewed from the front thereof.

The housing unit 24 is featured by a mounting surface 25 for mounting the camera 1 and by side walls 26 standing upright from the two opposite ends of the mounting surface 25. The side walls 26 protect the top and bottom surfaces of the camera 1 to be mounted onto the mounting surface 25 and determine the position of the camera in the direction of the camera height. The stand body 23 is featured by a flat surface part 23-1 for forming a wall in the rear side of the above noted housing unit 24 and by the turning unit 27 in a cylindrical shape forming a turning surface 27-1 which is positioned approximately on the same plane as the flat surface part 23-1 at the center thereof.

The turning unit 27 is in a cylindrical shape, with the end face thereof featuring the turning surface 27-1, and is positioned in the stand body 23 so that the turning surface 27-1 faces the camera connection unit 12 when the camera 1 is housed in the housing unit 24.

The turning unit 27 is also mounted in an upper part of the stand body 23 with a part of the circumference of the cylindrical form exposing above the top surface of the stand body 23 as an operation unit.

And the turning surface 27-1 of the turning unit 27 is protrusively mounted by a stand connection unit 28 for electrically connecting with the camera connection unit 12 of the camera 1.

The stand connection unit 28 is configured to include a feeder terminal for feeding at least the camera 1 and, in addition, include a USB terminal and a video input terminal in the present embodiment.

And the stand connection unit 28 is mounted a little off center of the turning axis of the turning surface 27-1 of the turning unit 27 toward the radial direction.

The reason for the above is for moving the stand connection unit 28 to a suitable position by the user turning the turning unit 27 180 degrees in the direction of arrow "a" shown by FIG. 4D in order to accommodate the camera connection unit 12 of the camera 1 at changing positions in the direction of camera thickness in the housing unit 24 depending on the orientation of the camera 1, i.e., face up or face down, when it is mounted onto the housing 24. And the position will be altered accordingly between the two positions as shown by FIG. 4B or FIG. 4C.

That is, turning the turning unit 27 will select either one from the two positions shown by FIG. 4B or FIG. 4C. In other words, the shifter unit for shifting the position of the stand connection unit 28 is comprised by the turning unit 27.

The turning surface 27-1 of the turning unit 27 is mounted by a plate shaped connection inhibiter member 29 nearby the stand connection unit 28. The connection inhibiter member 29 is mounted so that the tip thereof is more protrusive than that of the stand connection unit 28 toward the direction of the mounting camera.

This inhibits a connection between the stand connection unit 28 and the camera connection unit 12 when the position of the stand connection unit 28 does not match with that of the camera connection unit 12, as described in detail later.

Meanwhile, the center part of the back surface of the stand body 23 is featured by a concave part 23-2, being depressed from the outside area by a step, which mounts a USB connector 31 for use in communication between the camera and the outside, and a DC connector 32.

And a video output terminal 33 is mounted on the lower part of the protruded surfaces surrounding the concave part 23-2 as shown by FIG. 4D. These connectors and terminals are corresponding to the terminal structures of the above described stand connection unit 28 and connected electrically with the internal circuit, although it is not shown.

On the protruded surfaces on either side of the concave part 23-2 on the back side of the stand body 23, a bent over, extension part 26-1 extended from the side wall 26 of the housing unit 24 is engaged, as shown by FIG. 4D. And a part of the extension part 26-1, which engages with the protrusion where the video output terminal 33 is mounted, is featured by a video output terminal opening 26-1-1.

FIG. 5A is a diagonal perspective view showing the above described housing unit 24 only; FIG. 5B is a diagonal perspective view showing a state of the housing unit 24 uniting with the stand body 23 detachably. The same component numbers are assigned to FIGS. 5A and 5B as FIGS. 4A and 4B where the configurations are the same with each other.

As shown by FIGS. 5A and 5B, the stand apparatus 22 according to the present embodiment is configured so that the housing unit 24 and the stand body 23 are mutually detachable.

This configuration enables the stand apparatus to easily accommodate a kind of camera differently shaped from the camera 1 just by switching the housing units 24.

Third Embodiment

FIG. 6A through 6D describes two ways for mounting the camera 1 to the stand apparatus 22 according to a third embodiment.

Note that FIG. 6A through 6D omit things like a DC plug and DC wires connected with the DC power connector 32, shown by FIG. 4D, mounted on the back of the stand apparatus 22, a USB male connector and its extension cord connected with the USB connector 31 as required, et cetera.

FIGS. 7A and 7B show the positions of the connection inhibiter member 29 in relation with the camera 1 coming to be mounted onto the camera stand apparatus 22.

Figure 6B:
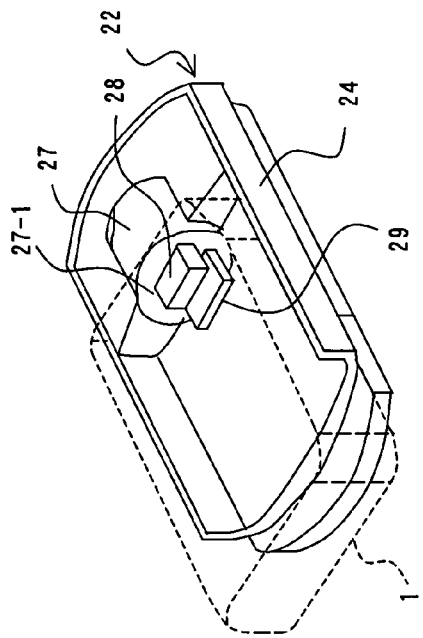
FIG. 6A through 6D describes two ways for mounting a camera to a camera stand apparatus according to a third embodiment.
Figure 6D:
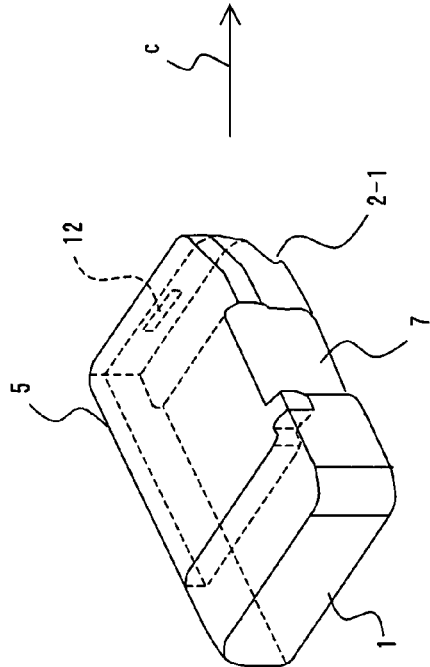

FIGS. 7A and 7B are cross-sectional view from the side of drawings of FIGS. 6D and 6B in the direction of camera width with the viewpoint being primarily focused on the connection unit.

Figure 6A:
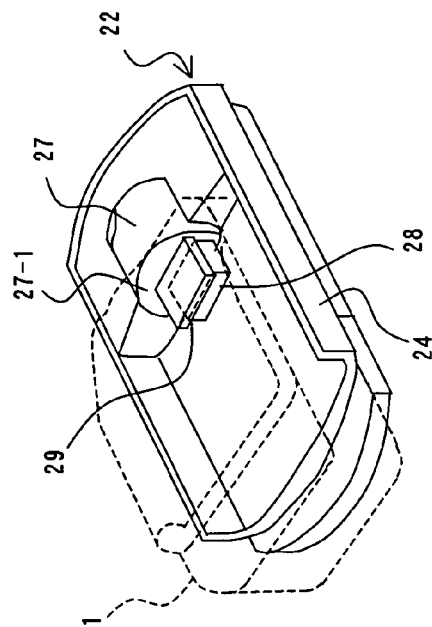

FIG. 6A shows the camera 1 in a state as shown by FIGS. 3A and 3B lying flat with the display surface 5-1 of the display apparatus 5 facing up; and FIG. 6B shows a state in which the turning unit 27 of the stand apparatus 22 is turned around so that the positional relationship of the stand connection unit 28 and connection inhibiter member 29 is shifted to the position shown by FIG. 4B.

Keeping the above described state of FIG. 6A, and moving the camera 1 as indicated by the arrow b shown by FIG. 6 to mount the camera 1 onto the stand apparatus 22 as shown by the dotted line in FIG. 6B makes the edge of the connection inhibiter member 29 go over the step part 2-1 of the camera body 2 (FIG. 7B) and accordingly the stand connection unit 28 comes to connect with the camera connection unit 12.

As described above, mounting the camera 1 facing down onto the stand apparatus 22 makes it possible for the user to perform various processing by operating the mode dial 17, cross button 18 or auxiliary operation buttons 19 (refer to FIG. 3A) while looking at the display surface 5-1 of the display apparatus 5, even while the camera 1 is being recharged by the DC power supply by way of the DC power connector 32.

Figure 6C:
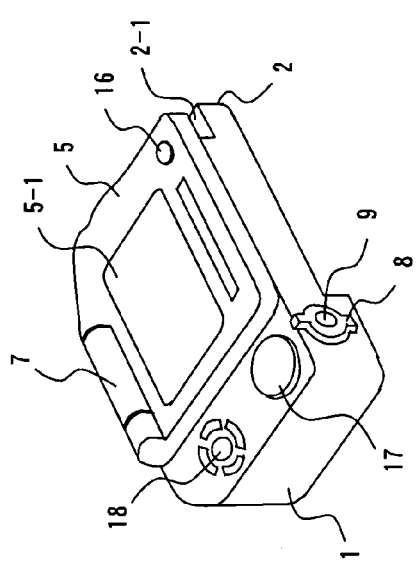

Meanwhile, FIG. 6C shows the camera 1 in the state as shown by FIGS. 1A, 1B and 1C lying with the front face up.

On the other hand, the stand apparatus 22 shown by FIG. 6D is in the state in which the relationship between the stand connection unit 28 and connection inhibiter member 29 is moved to the position shown by FIG. 4C from that shown by FIG. 4B as a result of turning the turning unit 27.

Keeping this state, and moving the camera 1 as shown by the arrow c shown in FIG. 6 toward the housing unit 24 of the stand apparatus 22 and mounting the camera 1 thereon as shown by the dotted lines in FIG. 6D cause the edge of the connection inhibiter member 29 to go underneath the stepping part 2-1 of the camera 1 (FIG. 7A) and in addition the stand connection unit 28 to be connected with the camera connection unit 12. As described above, the height of camera connection unit 12 is not changed vis-a-vis the camera 1 whether it is head up or resupinate, that is, if the camera 1 is placed upside down from the position shown by FIG. 1B, when mounting it onto the housing unit 24 of the stand apparatus 22.

Accordingly, there is no change in the matching relationship between the camera connection unit 12 and the turning surface 27-1 of the turning unit 27, which is positioned at the center of the flat surface part 23-1 forming the back wall of the housing unit 24 of the stand apparatus 22.

This makes it possible to accommodate easily the camera connection unit 12 of the camera 1 when changing the mounting positions, i.e., facing up or down, by turning the turning unit 27 by 180 degrees so as to shift the stand connection unit 28 equipped in the turning surface 27-1 to either position shown by FIG. 4B or the other shown by FIG. 4C.

Furthermore, if the camera 1 is tried to mount onto the stand apparatus 22 with the relationship between the mounting position of the camera 1 and the stand connection unit 28 of the turning unit 27 in the stand apparatus 22 being in the state shown by FIG. 6A and FIG. 6D, respectively, the connection inhibiter member 29 positions itself in the shaded position 29-c as shown by FIG. 7B so as to collide with the side of the camera body 2 where a step part 2-1 is not featured before the stand connection unit 28 comes to be connected with the camera connection unit 12, thereby inhibiting the camera 1 to be farther pushed into the stand apparatus 22.

This prevents a wrong connection between the stand connection unit 28 and the camera connection unit 12.

Likewise, if the camera 1 is tried to mount onto the stand apparatus 22 with the relationship between the mounting position of the camera 1 and the stand connection unit 28 of the turning unit 27 in the stand apparatus 22 being in the state shown by FIG. 6C and FIG. 6B, respectively, the connection inhibiter member 29 positions itself in the shaded position 29-b as shown by FIG. 7A, in this case as well, so as to collide with the side of the camera body 2 where a step part 2-1 is not featured before the stand connection unit 28 comes to be connected with the camera connection unit 12, thereby inhibiting the camera 1 from being farther pushed into the stand apparatus 22.

Therefore, this too prevents a wrong connection between the stand connection unit 28 and the camera connection unit 12.

Mounting the camera 1 this way, i.e., facing up, onto the stand apparatus 22 eliminates a concern over damaging the display surface 5-1 of the display apparatus 5 if a certain thing happens to fall onto, or come into contact with, the camera 1 while it is being recharged by a DC power source through the DC connector 32, enabling the user to leave it as is. FIG. 8 is a block diagram of the whole camera system when the camera 1 is correctly mounted onto the stand apparatus 22.

First of all, as shown by FIG. 8, the camera 1 comprises a main equipment operation unit 34, a C-CPU 35 (Camera CPU (central processing unit)) connected with the main equipment operation unit 34, an imaging unit 37 connected with signal input & output ports of the C-CPU 35 by way of a bus 36, an image display unit 38, a memory card 39, an image process unit 41 and an IF (interface) unit 42.

The C-CPU 35, having a program memory therein (not shown), controls the whole camera 1, in compliance with instruction commands from the camera user inputting through the main equipment operation unit 34, based on the program stored in the program memory.

The above noted image display unit 38, memory card 39 and image process unit 41 are configured for being capable of mutual data input and output by way of the bus 36.

Meanwhile, the imaging unit 37 is connected by an image pickup device 43, while the image process unit 41 is connected by a video circuit unit 44 for converting an image signal into a video signal such as NTSC.

An image photographed by a lens 45 is focused on the above noted image pickup device 43 which is controlled for operation by the imaging unit 37 so as to convert a light intensity of each pixel of the above noted focused image into an electric signal for outputting to the image process unit 41.

The image process unit 41 amplifies the received electric signal from the image pickup device 43, A/D (analog/digital)-converts the signal, and outputs the amplified A/D converted image data to the memory card 39.

The image display unit 38 drives and controls display of the display apparatus 5 for displaying photographed images and operation menus in the liquid crystal display apparatus.

The above noted IF unit 42 will be connected by external equipment such as a PC (personal computer) 46 by way of the USB connector 31 of the stand body 23, the stand connection unit 28 comprised by the stand apparatus 22 and the camera connection unit 12.

The above described configuration makes it possible to transmit the photographed image data stored by the memory card 39 of the camera 1 to the PC 46 for storing therein or having the image be displayed by the display apparatus thereof.

It is also possible to check the photographed images already stored in the PC 46.

Meanwhile, the video circuit unit 44 will be connected by a TV (television) 47 for example, by way of the camera connection unit 12, the stand connection unit 28 of the stand apparatus 22 and the video output terminals 33 equipped in the stand body 23.

This makes it possible to display the image photographed by the camera 1 on a larger screen of the TV 47 for viewing.

The main equipment operation unit 34, comprising the various input buttons and switches as shown by FIGS. 1 through 3, has a circuit for notifying the C-CPU 35 of the event information inputted from the outside (i.e., the camera user) through these input buttons and switches.

The output part of the charging unit 48 is connected by a housed battery 49, and the input part thereof is connected by an output connector of the A/D converter 51 by way of the camera connection unit 12, the stand connection unit 28 of the stand apparatus 22 and the DC power connector 32 equipped in the stand body 23.

The input connector of the AC/DC converter 51 will be connected to a home-use commercial power connector for example, thereby charging the battery 49.

Note that the stand body 23 of the stand apparatus 22 is equipped with the second stand connection unit 52, in addition to the above described stand connection unit 28 as the first connection unit, although not shown in FIGS. 4 through 6.

The second stand connection unit 52 is for connecting electrically with a connector of other accessory without going through an external circuit, which will be described in the following.

Figure 9:
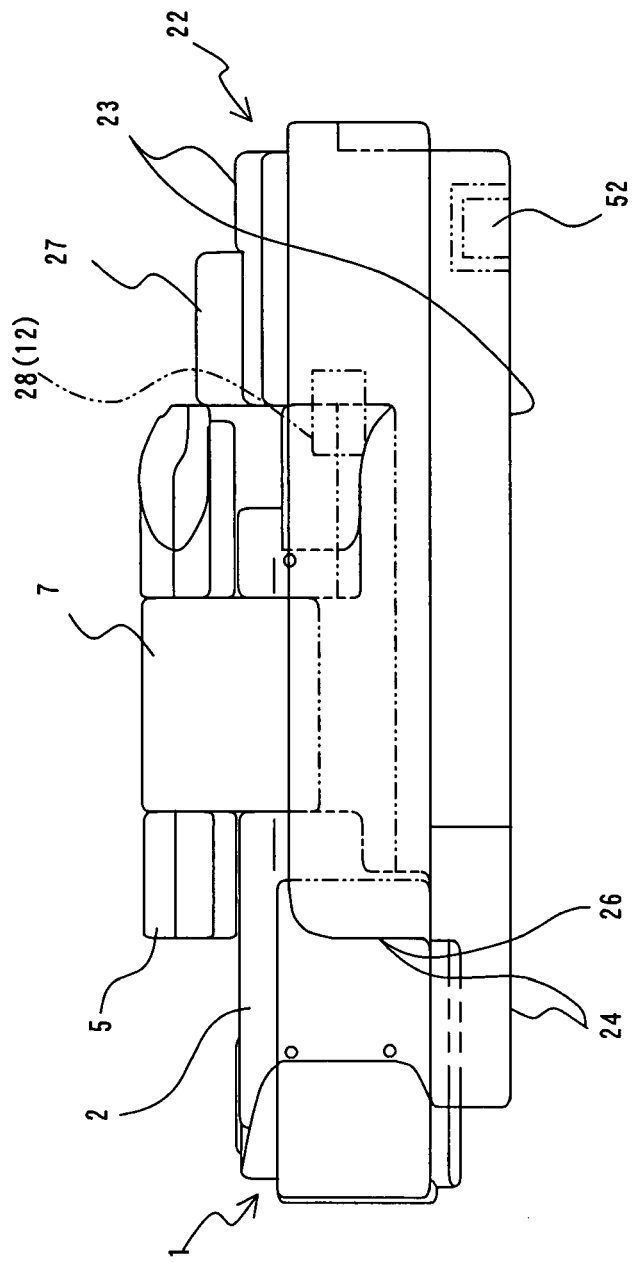
FIG. 9 shows a side view of a state in which a camera and a camera stand apparatus unite to form a camera system.

FIG. 9 shows a side view of state in which the camera 1 and the camera stand apparatus 22 unite, as shown by the dotted lines in FIG. 6B, to form a camera system shown by FIG. 8.

Note that the same component numbers are assigned to the components common with the configuration shown by FIGS. 1 through 6 in showing FIG. 9 where the configurations are easy to understand.

In FIG. 9, the left side of the figure corresponds to the front of the stand apparatus 22 and the right side corresponds to the rear thereof. The rear bottom part of the stand apparatus 22 is equipped by the second stand connection unit 52, shown by FIG. 8, facing downward.

Fourth Embodiment

FIG. 10A shows a diagonal perspective view of a hard disk apparatus as a second accessory with an expansive function for the above described camera 1 according to an embodiment 4.; FIG. 10B shows a cross-sectional view from the direction of arrow d indicated in FIG. 10A; FIG. 10C shows a state of the hinged part shown by FIG. 10B being closed.

Note that the interior of the hard disk apparatus 55 is equipped with a hard disk, its drive apparatus, et cetera, as large capacity storage media apparatus for recording image data of the camera 1, although FIG. 10B and 10C do not show them.

As shown by FIG. 10A, the hard disk apparatus 55 comprises a DC power connector 57 and a USB connector 58 both of which are on one side of the main chassis 56 (on the right diagonal near side of FIG. 10A).

The DC power connector 57 is a power input unit for supplying power to not only the hard disk in the inside, but also to the camera 1 from the outside when it is connected by way of the stand apparatus 22 as described later. And the USB connector 58 is a signal output unit for outputting various output signals from the camera 1 through the stand apparatus 22, when the camera 1 is connected, and hard disk data to the PC 46, et cetera.

Meanwhile, the hard disk apparatus 55 comprises a quarter-turn cover 59 on the upper part of one end of the main chassis 56 (the diagonal right upper part of an edge as shown by FIG. 10A) as a shield member.

The quarter-turn cover 59 can be turned 90 degrees between the vertical position against the main chassis 56 and the horizontal position being fallen forward thereon around the hinge 61 as pivot as shown by FIG. 10B and 10C.

The quarter-turn cover 59 is integrally featured by a connection unit support member 62 and a hard disk connection part 63 being attached thereon.

This causes the hard disk connection part 63 of the hard disk apparatus 55 to be exposed to the outside in linking with the quarter-turn cover 59 turning to the vertical position and the hard disk connection part 63 to be shielded from the outside in linking with the quarter-turn cover 59 turning to the horizontal position.

The hard disk apparatus 55 has a flat outer shape so as to mount the stand apparatus 22 on top of the main chassis 56.

Figure 11:
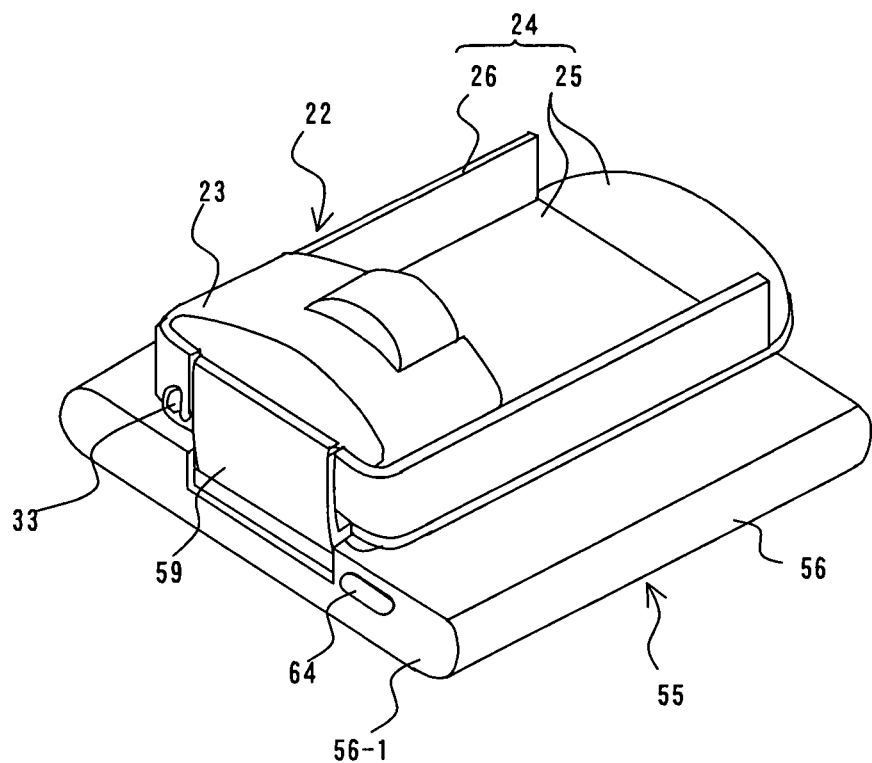
FIG. 11 shows a state of a stand apparatus placed onto a hard disk apparatus with its hard disk connection part opening by a quarter-turn cover turning to its vertical position.

FIG. 11 shows a state of the stand apparatus 22 placed onto the externally flat shaped main chassis 56 of the hard disk apparatus 55 with the hard disk connection part 63 being exposed to the outside by the quarter-turn cover 59 turning to the vertical position, as shown by FIGS. 10A and 10B, and with the second stand connection unit 52 connecting with the hard disk connection part 63 although the aforementioned two components cannot be seen in the figure.

As shown by FIG. 11, the rear side surface 56-1 of the main chassis 56 of the hard disk apparatus 55 is installed by a quarter-turn cover release button 64 nearby the place where the quarter-turn cover 59 is mounted.

When the user presses the quarter-turn cover release button 64, the quarter-turn cover 59 moves from the horizontal position shown by FIG. 10C to the vertical position shown by FIG. 10B, and when the user pushes the quarter-turn cover 59 from the vertical position it goes back to the horizontal position.

As shown by FIG. 11, when the stand apparatus 22 is mounted and installed onto the main chassis 56 of the hard disk apparatus 55, the DC power connector 32 and USB connector 31 equipped in the concave part 23-2 in the back of the stand body 23 of the stand apparatus 22 as shown by FIG. 5B are now shielded from the outside by the quarter-turn cover 59.

This inhibits the user from connecting a DC connection and USB connection with the outside through the stand apparatus 22, hence enabling the aforementioned task by the DC power connector 57 and USB connector 58, shown by FIG. 10A, comprised by the hard disk apparatus 55 primarily without fail.

Therefore, there is no danger of damaging the circuit as a result of connecting two DC power sources nor is there any possibility of two USBs connecting to cause an error.

As such, the above described quarter-turn cover 59 has the functions of being not only a shield member but also an inhibiter unit for inhibiting the stand apparatus 22 from connecting a DC power source and USB connections with the outside.

The quarter-turn cover 59 has also a function of permission unit for permitting the hard disk connection part 63 connecting with the outside by opening the hard disk connection part 63 so as to enable a connection with the outside as shown by FIGS. 10A and 10B, linking with inhibiting the stand apparatus 22 from connecting a DC power source and USB connections with the outside when turning to the vertical position as described above.

As described above, the quarter-turn cover 59 opens the connection part of the hard disk apparatus 55 as the second accessory in linking with shielding the power input unit of the stand apparatus 22 as the first accessory and shield the connection part of the hard disk apparatus 55 in linking with opening the power input unit of the stand apparatus 22.

Figure 12:
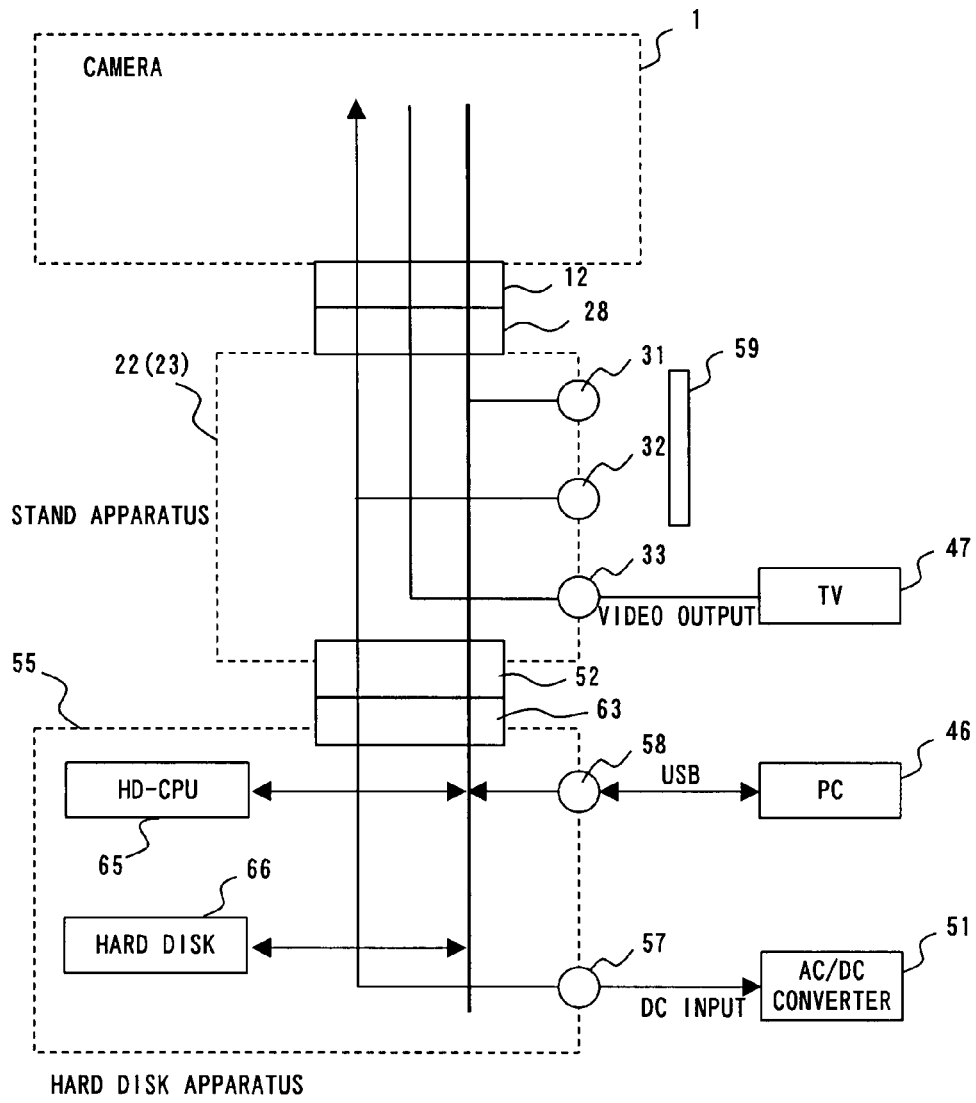
FIG. 12 is a block diagram of a camera and accessory system with a camera being attached to a stand apparatus correctly in forming an accessory apparatus by coupling a hard disk apparatus with a stand apparatus.

FIG. 12 is a block diagram of a camera and accessory system with the camera 1 being mounted onto the stand apparatus 22 correctly as shown by the dotted and solid lines by FIG. 6B or 6D in forming an accessory apparatus by coupling the hard disk apparatus 55 with the stand apparatus 22.

In FIG. 12, the configuration of camera 1 and that of stand apparatus 22 are the same as the case of FIG. 7, except that the USB connector 31 and DC power connector 32 are shielded by the quarter-turn cover 59 from the outside so as to be inhibited from connecting with the PC 46 and AC/DC converter 51 shown by FIG. 7.

In place of the above, the USB connector 58 and DC power source connector 57 of the hard disk apparatus 55 are now usable, which the PC 46 and AC/DC converter 51 are respectively connected with.

As shown by FIG. 12, the hard disk apparatus 55 comprises an HD-CPU (hard disk CPU) 65 and a hard disk 66 operating under the control of the HD-CPU 65.

The hard disk 66 records and accumulates image data from the camera 1 as described above.

In the camera & accessory system, all power supply is supplied from the AC/DC converter 51 by way of the DC power source connector 57 of the hard disk apparatus 55, and all signals from the camera 1 to the outside of the system is outputted by way of the USB connector 58 of the hard disk apparatus 55 to the PC 46 for example.

The camera 1 is charged by the stand apparatus 22 as in the case of FIG. 7.

As such, the camera can be connected with two accessories without a complex external wiring to perform the various processing.

Incidentally, while the quarter-turn cover 59 is equipped on the side of the hard disk apparatus in the above described fifth embodiment, it is not limited as such and the quarter-turn cover 59 may be equipped in the stand apparatus 22.

That is, interchanging the configuration of the second stand connection unit 52 of the stand apparatus 22 with that of the quarter-turn cover 59 of the hard disk apparatus 55 and hard disk connection part 63 integrated with the quarter-turn cover 59 will acquire the same operation and effect as described above.

Meanwhile, the stand apparatus 22 will become a charging apparatus for the electronic equipment (e.g., camera) if the USB connector 31 is removed from the stand apparatus 22 so as to comprise only a DC power connector for supplying power to the camera from the outside. That is, the stand apparatus 22 as the first accessory can also be configured as a charging apparatus.

Also note that the present embodiment has described a hard disk apparatus as the second accessory, but it is not limited as such and the second accessory may be configured by an image communication apparatus for instance.

Also the above described embodiments all adopt a camera as electronic equipment, but it goes without saying that the present invention is not limited as such and all portable electronic equipment furnished with a camera, such as a mobile phone furnished with a camera or a personal digital assistant (PDA) furnished with a camera may be applied.

What is claimed is:

1. A stand apparatus, being the stand apparatus for housing electronic equipment in electrical connection with the stand apparatus, comprising:
   a housing unit for housing the electronic equipment in at least two different orientations;
   a stand body comprising a stand connection unit for connecting with a connection unit of the electronic equipment; and
   a shifter unit for shifting a position of the stand connection unit in response to an orientation of the electronic equipment being housed in the housing unit,
   wherein the shifter unit is installed in the stand body and includes a turning unit for shifting a position of the stand connection unit,
   wherein the stand connection unit is installed at a position displaced from the turning center axis of turning face of the turning unit in a radial direction and places itself in two positions by the turning unit turning in response to a corresponding connection unit of the electronic equipment, whose position in the housing unit changes according to an orientation of the electronic equipment being housed therein, and
   wherein the stand connection unit shifts the two positions from one position to the other by the turning unit turning approximately 180 degrees.

2. The stand apparatus according to claim 1, wherein the housing unit houses the electronic equipment in either a front facing up orientation, or a front facing down orientation.

3. The stand apparatus according to claim 1, wherein the turning unit feeds the electronic equipment housed in the housing unit from the stand connection unit by way of the connection unit of the electronic equipment.

4. The stand apparatus of claim 1, wherein the electronic equipment is a camera.

5. A stand apparatus, being the stand apparatus for housing electronic equipment in electrical connection with the stand apparatus, comprising:
- a housing unit for housing the electronic equipment in at least two different orientations;
- a stand body comprising a stand connection unit for connecting with a connection unit of the electronic equipment;
- a shifter unit for shifting a position of the stand connection unit in response to an orientation of the electronic equipment being housed in the housing unit, wherein the shifter unit is installed in the stand body and includes a turning unit for shifting a position of the stand connection unit, and wherein the stand connection unit is installed at a position displaced from the turning center axis of turning face of the turning unit in a radial direction and places itself in two positions by the turning unit turning in response to a corresponding connection unit of the electronic equipment, whose position in the housing unit changes according to an orientation of the electronic equipment being housed therein; and
- a connection inhibiter member, being installed nearby the stand connection unit in the turning face, for inhibiting a connection between the stand connection unit and the connection unit of the electronic equipment when a position of the stand connection unit is not corresponding to that of the connection unit of the electronic equipment.

6. A stand apparatus, being the stand apparatus for housing electronic equipment in electrical connection with the stand apparatus, comprising:
- a housing unit for housing the electronic equipment in at least two different orientations;
- a stand body comprising a stand connection unit for connecting with a connection unit of the electronic equipment; and
- a shifter unit for shifting a position of the stand connection unit in response to an orientation of the electronic equipment being housed in the housing unit,
- wherein the shifter unit is installed in the stand body and includes a turning unit for shifting a position of the stand connection unit,
- wherein the stand connection unit is installed at a position displaced from the turning center axis of turning face of the turning unit in a radial direction and places itself in two positions by the turning unit turning in response to a corresponding connection unit of the electronic, whose position in the housing unit changes according to an orientation of the electronic equipment being housed therein,
- wherein the housing unit comprises a mounting surface for mounting the electronic equipment and side walls vertically structured from the opposing two ends of the mounting surface for protectively positioning two sides of the electronic equipment,
- wherein the stand body comprises a flat part which forms a rear wall of the housing unit, and
- wherein the turning unit is of a cylindrical shape whose end surface is featured as the turning face which forms a surface approximately flush with the flat part of the stand body, is positioned for corresponding to a connection unit of the electronic equipment when it is mounted onto the housing unit, and is positioned so as to expose a part of its circumferential surface of the cylindrical shape above the stand body as operation part.

7. The stand apparatus according to claim 6, wherein the housing unit and the stand body are detachably attached with each other.

8. A camera system, being the camera system comprising a camera and a stand apparatus housing the camera in electrical connection with the stand apparatus, wherein
- the camera comprises a connection unit on one side thereof for connecting with the stand apparatus electrically and a moving unit for moving a display apparatus for displaying a photographed image to the front and rear positions of the camera, and when housing the camera in the housing of the stand apparatus, the moving unit places the display surface of the display apparatus facing the front of the camera in the case of housing the camera facing up, while moves the display apparatus to the rear position of the camera and places the display surface exposed to the outside in the case of housing the camera facing down, and
- the stand apparatus comprises a housing unit for housing the camera in either a front facing up orientation or a front facing down orientation thereof, a stand connection unit for connecting with the connection unit of the camera electrically, and a shifter unit for shifting a position of the stand connection unit in response to an orientation of the camera being housed.

9. The camera system according to claim 8, wherein the connection unit of the camera is installed so as to be positioned at the center of the height of the camera.

10. The camera system according to claim 8 wherein the connection unit of the camera is for connecting electrically with the connection unit of the stand apparatus when the stand apparatus houses the camera in either a front facing up orientation, or a front facing down orientation.

* * * * *